(12) United States Patent
Parkinson

(10) Patent No.: US 11,780,178 B2
(45) Date of Patent: Oct. 10, 2023

(54) CONTROLLED SHEAR VACUUM FORMING FOR SHAPING PREFORMS

(71) Applicant: CYTEC INDUSTRIES INC., Princeton, NJ (US)

(72) Inventor: Robert Parkinson, Wrexham (GB)

(73) Assignee: CYTEC INDUSTRIES INC., Princeton, NJ (US)

( * ) Notice: Subject to any disclaimer, the term of this patent is extended or adjusted under 35 U.S.C. 154(b) by 80 days.

(21) Appl. No.: 17/613,429

(22) PCT Filed: May 14, 2020

(86) PCT No.: PCT/US2020/032893
§ 371 (c)(1),
(2) Date: Nov. 22, 2021

(87) PCT Pub. No.: WO2020/242777
PCT Pub. Date: Dec. 3, 2020

(65) Prior Publication Data
US 2022/0212421 A1    Jul. 7, 2022

Related U.S. Application Data

(60) Provisional application No. 62/855,012, filed on May 31, 2019.

(51) Int. Cl.
*B29C 70/34* (2006.01)
*B29C 70/54* (2006.01)
*B29K 105/08* (2006.01)
*B29L 31/30* (2006.01)

(52) U.S. Cl.
CPC ............ *B29C 70/342* (2013.01); *B29C 70/54* (2013.01); *B29K 2105/0845* (2013.01); *B29K 2105/0854* (2013.01); *B29K 2105/0881* (2013.01); *B29L 2031/3085* (2013.01)

(58) Field of Classification Search
CPC .................................................. B29C 70/342
See application file for complete search history.

(56) References Cited

U.S. PATENT DOCUMENTS

| 5,348,602 A | * | 9/1994 | Makarenko | ............ B29C 70/56 156/286 |
| 9,259,859 B2 | | 2/2016 | Blackburn et al. | |
| 2006/0108057 A1 | * | 5/2006 | Pham | .................... B29C 70/446 156/583.1 |

FOREIGN PATENT DOCUMENTS

| CA | 2898331 A1 | * | 10/2014 |
| DE | 102017113505 A1 | * | 12/2018 |
| DE | 102017113505 B2 | | 12/2018 |
| JP | 2016-514634 A | * | 5/2016 |
| WO | 2017127772 A1 | | 7/2017 |

* cited by examiner

*Primary Examiner* — Jeffry H Aftergut

(57) ABSTRACT

A controlled shear vacuum forming method that includes forming a three-dimensional (3D) structure from a preform material on a molding tool using restraints during vacuuming to prevent wrinkling. The restraints are withdrawn during vacuuming to allowing the preform material to come into contact with the sidewalls of the molding tool in a gradual manner. Such forming method is particularly suitable for forming wing spars with bent sections and/or curved contours.

20 Claims, 5 Drawing Sheets

CONTROLLED SHEAR VACUUM FORMING FOR SHAPING PREFORMS

CROSS-REFERENCE TO RELATED APPLICATIONS

The instant application is a U.S. national phase entry under 35 U.S.C. § 371 of International Application No. PCT/US2020/032893 filed on May 14, 2020, which claims the benefit of prior U.S. Provisional Application No. 62/855,012 filed on May 31, 2019, the content of each of these prior filed applications is incorporated herein by reference in its entirety.

The present disclosure relates generally to the manufacturing of fiber-reinforced composite parts.

DETAILED DESCRIPTION

Fiber-reinforced composite materials have been used to fabricate structural parts in the aerospace and automotive industries. These composite materials contain reinforcement fibers embedded in a polymer matrix. Their light-weight property is particularly advantageous when compared to similar parts constructed from metals. Three-dimensional (3D) composite parts can be manufactured by shaping a flat, 2-dimensional (2D) preform blank on a forming tool. The preform blank may be composed of multiple prepreg plies in a stacking arrangement. Each prepreg ply is composed of continuous reinforcement fibers impregnated with a curable matrix resin, such as an epoxy-based resin, or a thermoplastic polymer. Multiple plies of prepreg may be cut to size for laying up, then subsequently assembled and shaped on a molding tool. Optionally, heating may be applied to the prepregs in order to gradually deform it to the shape of the molding surface. Alternatively, the 2D preform blank may be composed of multiple dry fiber layers or fabric plies, which have not been fully impregnated with a resin or polymer matrix. Such fibrous preform blank can be shaped on a molding tool using heat and pressure, followed by infusing the shaped preform with a liquid resin in a resin infusion process such as Resin Transfer Molding (RTM) or Vacuum Assisted Resin Transfer Molding (VARTM).

Figure 1:
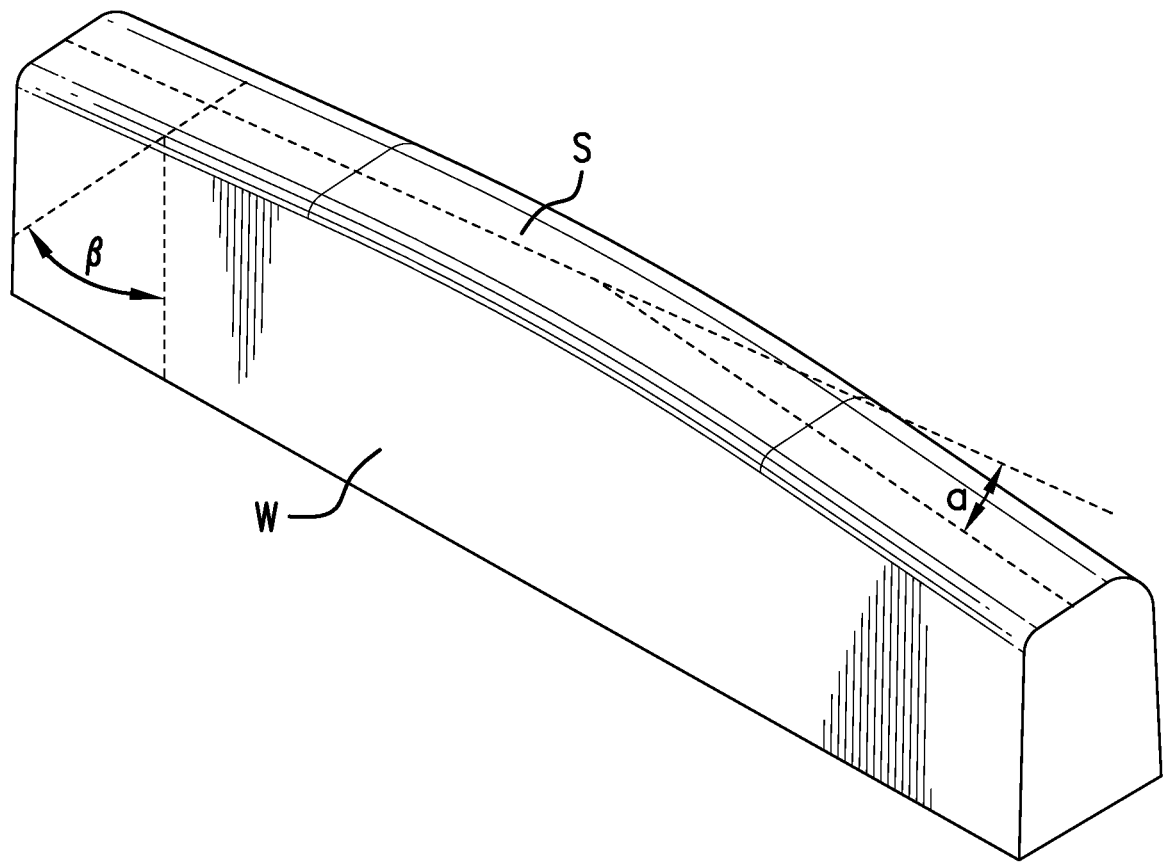
FIG. 1 shows a molding tool having a curved surface for forming a wing spar section.

To form the shaped preform for certain aircraft parts, such as wing spars, conforming a 2D material or "blank" against a tool surface such as that shown in FIG. 1 can result in the material being present in the preform that is in the wrong place. In FIG. 1, there are two tangential lines along the top curved surface S (or "web surface") of the tool that intersect to form an angle $\alpha$. The top curved surface S forms another angle $\beta$ with the side surface W of the tool. $\alpha$ does not have to be large for there to be enough excess material on the side surface W to create wrinkles. When a 2D material is pressed against the web surface S and the side surfaces W of the tool to form side flanges, the presence of angle a and angle $\beta$ result in the excess material being present in the side flanges, resulting in wrinkles therein.

As the fiber reinforcement of a composite material is often chosen for its ability to resist plastic deformation change in length, the excess material has to be moved by shearing within a ply or between plies. Until fibers are supported by a solid matrix they are not very resistant to buckling. A preform composed of fabric plies may be shaped by enclosing the preform with a flexible diaphragm and applying vacuuming. During such vacuum diaphragm forming, the point at which some of the fabric plies within the preform will buckle is often reached before the point at which other fabric plies will shear. Such problem is especially likely when a preform is made for wing spars with L or U cross-sections and bent sections along the spar's length. The difficulty is increased with these long parts as the amount of material that has to simultaneously shear increases with length and thickness, while the resistance to buckling only increases with thickness.

A controlled shear vacuum forming method is disclosed herein that includes forming a three-dimensional (3D) structure from a preform material on a molding tool using restraints during vacuuming to prevent wrinkling. The preform material could be loosely stacked fabric plies to which a binder is applied prior to or during stacking. The preform material may also be a stack of fiber layers that have been previously bonded together by a binder. Such fabric plies and fiber layers are porous and liquid permeable. The preform material can also be a layup of prepreg plies, each prepreg ply containing fiber reinforcement embedded in a polymer or resin matrix. Such forming method is particularly suitable for forming wing spars with bent sections and/or curved contours.

The controlled shear vacuum forming method of the present disclosure includes:
  (a) providing a molding tool having a length, a web surface along the length dimension with a convex bent section, and two contiguous sidewalls extending from the web surface for forming flanges;
  (b) placing a preform material (referred herein as "blank") on a flexible diaphragm;
  (c) placing the molding tool over the intermediate blank such that the web surface of the molding tool is in contact with the blank;
  (d) placing at least two movable inner restraints next to each sidewall of the molding tool such that one end of each inner restraint is adjacent to the bent section of the web surface;
  (f) forming a vacuum sealed chamber defined by the flexible diaphragm and the molding tool, said sealed chamber enclosing the inner restraints and the intermediate blank;

(g) evacuating air from the sealed chamber until a partial vacuum is reached such that the flexible diaphragm is pulled toward the molding tool; and (h) withdrawing each inner restraint along the sidewall of the molding tool in a direction away from the bent section during evacuation of the sealed chamber such that there are at least two inner restraints moving in opposite direction along each sidewall of the molding tool, thereby allowing the blank to come into contact with the sidewalls of the molding tool in a gradual manner; and (g) increasing vacuum pressure after the restraints have been withdrawn and the entire blank has conformed to the molding tool, thereby forming a shaped preform, the vacuum pressure being sufficient to consolidate the shaped preform.

Figure 2:
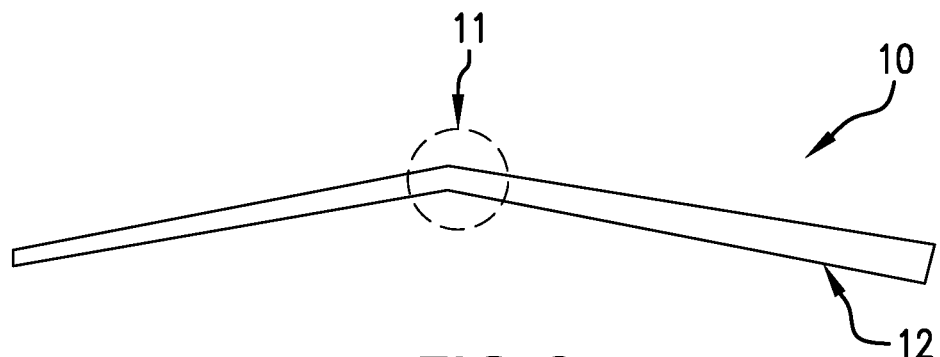
FIG. 2 shows a side view of a spar section.
Figure 3:
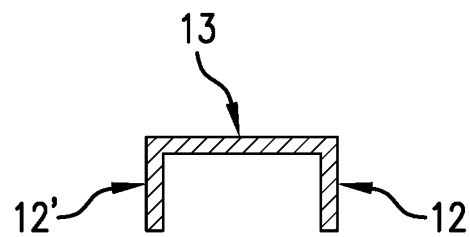
FIG. 3 shows a cross-sectional view of the spar section shown in FIG. 2.

The shear vacuum forming method will now be described with respect to forming a spar section 10 with the side view configuration shown in FIG. 2, as an example. It should be understood that the shear vacuum forming method disclosed herein is applicable to structures having other geometries. The spar section 10 has a convex bent section 11 along its length as shown in FIG. 2 and a U-shaped cross-section as shown in FIG. 3. As shown in FIG. 3, the spar section has flange sections 12 and 12' extending orthogonally from a web section 13.

Figure 4:
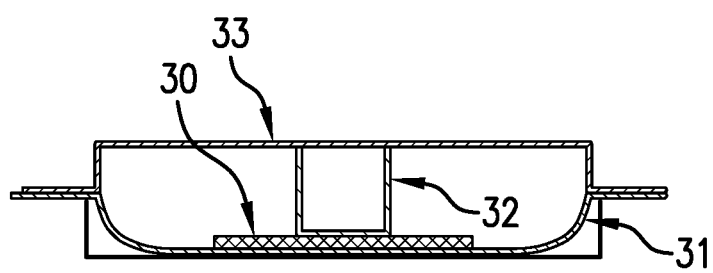
FIG. 4 shows the cross-sectional view of an initial arrangement for a controlled shear vacuum forming method according to one embodiment of the present disclosure.
Figure 5:
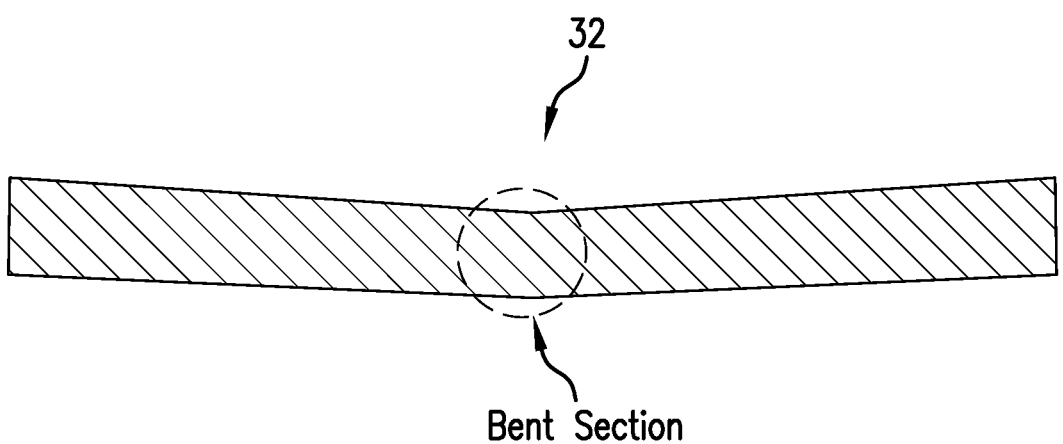
FIG. 5 shows the side view profile of a molding tool for forming a spar section.

FIG. 4 shows an exemplary initial arrangement of the shear vacuum forming method. This arrangement includes a preform material or blank 30 placed on a flexible diaphragm 31, a molding tool 32 placed over the preform blank 30, and a rigid lid 33 that engages with the flexible diaphragm 31. The molding tool 32 has a web surface which is in contact with the blank 30 and two sidewalls. During vacuuming, a sealed vacuum chamber is defined by the diaphragm 31 and the molding tool 32. FIG. 5 shows the side view profile of the tool 32, which has a bent section.

The diaphragm 31 may be a deformable or flexible sheet of material such as rubber, silicone, polyamide (nylon) or a similar material that has an elongation to failure of above 100% as determined by ASTM D882.

Figure 6:
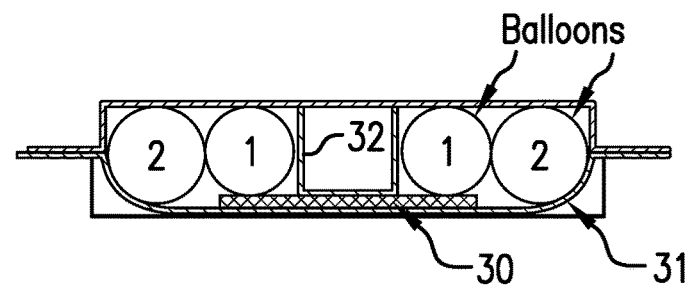
FIG. 6 shows the cross-sectional view of the arrangement for controlled shear vacuum forming using tubular balloons as restraints.
Figure 7:
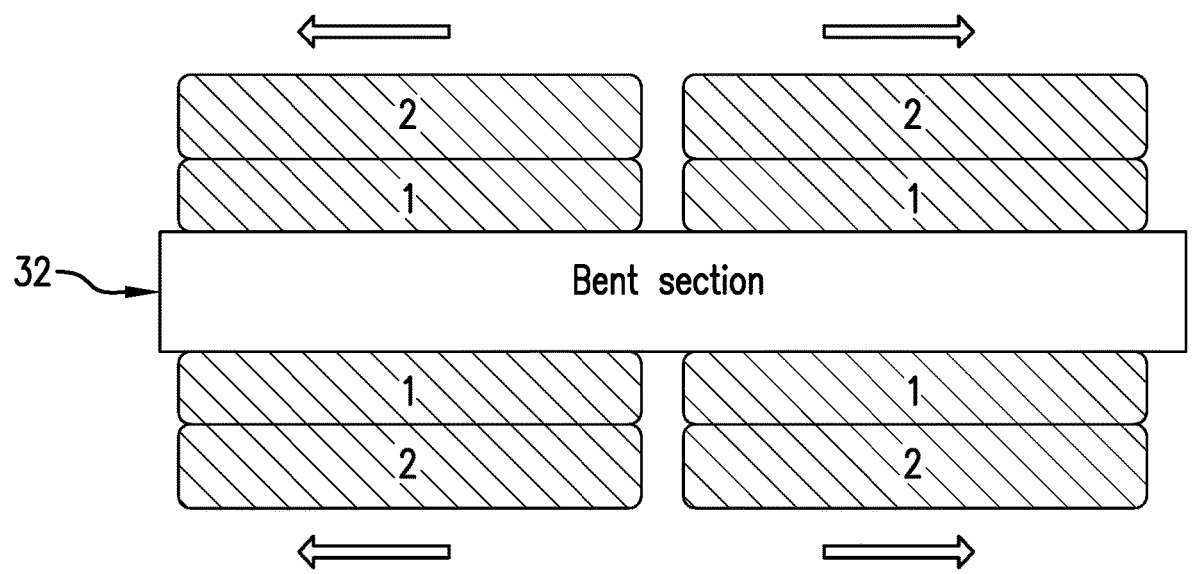
FIG. 7 shows the top view of the arrangement shown in FIG. 6.

Prior to applying vacuum pressure, inflated restraints in the form tubular balloons (1, 2) are inserted in the vacuum chamber, filling the spaces adjacent to each sidewall of the molding tool as illustrated in FIG. 6. In this way, the inner balloons (1) are positioned as a spacer between the tool's sidewalls and the portions of the blank that are not in contact with the tool. From top view as illustrated in FIG. 7, there are four groupings of tubular balloons, four inner balloons (1) and four outer balloons (2). The tubular balloons are removable from the vacuum chamber during vacuuming in the direction away from the bent section of the tool (shown by the arrows in FIG. 7). Each tubular balloon is configured so that its outer surface can be folded into the inner tubular center of the balloon. When the balloon is pulled away from the bent section of the tool along the length of the tool, the balloon does not create friction between itself and the diaphragm. Such tubular balloons are similar in configuration to the known water snake balloon toys or water wiggler toys.

Figure 8:
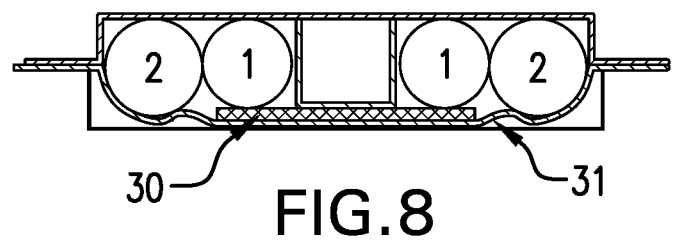
FIGS. 8-10 show the controlled shear vacuum forming process in various stages.
Figure 9:
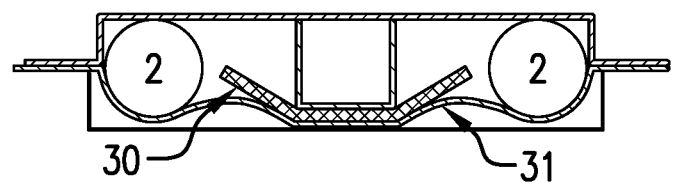
Figure 10:
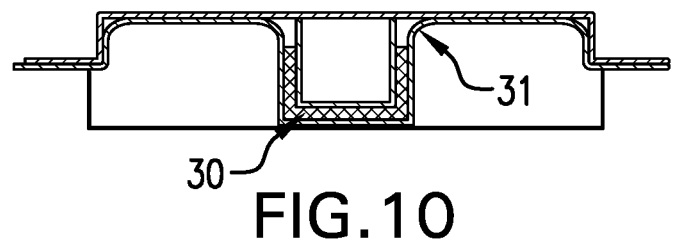

Next, partial vacuum is applied to the vacuum chamber illustrated by FIG. 8. Depending on the thickness of the diaphragm 31, the partial vacuum could be 50-90 mbar as example. During partial vacuuming, the inner and outer balloons (1, 2) are withdrawn from the vacuum chamber in the direction away from the bent section of the tool, but the inner balloons (1) start to retreat first as illustrated in FIG. 9. The inner balloons (1) maintain contact with the sidewalls of the tool while being withdrawn. A predetermined distance is maintained between the retreating end of the inner balloon (1) and the retreating end of the outer balloon (2). The balloons move in tandem such that the outer balloons (2) prevent the diaphragm 31 from being pulled into conformation with the tool's sidewalls too quickly. Referring to FIG. 10, as the outer balloons are being withdrawn, portions of the blank 31 that are not blocked by the inner balloons are brought into conforming contact with the tool's sidewalls by the unhindered sections of the diaphragm 31. Thus, the presence of the balloons prevents the entire blank 31 from conforming onto the sidewalls of the tool at the same time. As with similar double curvature parts, there is excess material in the flange at the bent section or bend. The force required to shear all the material of the flange on either side of the bend may be more than the force to buckle the material at the bend, however, as the flange at the bend is formed first and the distance between the edge of the formed flange to the edge of the unformed flange is larger than the length between the corresponding positions where the flange joins the web section, the excess material is progressively sheared away from the bend.

Once all balloons are withdrawn from the vacuum chamber, vacuum is increased (e.g., to full vacuum or 1 atm vacuum) to reduce the bulk of the resulting shaped preform, i.e., to consolidate the fiber layers of the preform. For certain preform materials that contain a binder and are flexible at ambient temperature, heat is applied after full vacuum to set the binder in the preform. For other preform materials such as thermoset prepregs, heat is applied prior to partial vacuum to soften the resin matrix in the prepregs. If the preform material is composed of thermoset prepregs, the softening temperature is above room temperature (20° C.-25° C.) but below the curing temperature of the resin matrix of the prepregs, for example, up to 60° C. If the preform material is composed of thermoplastic prepregs, the preform material is heated to a temperature above the glass transition temperature of the polymer matrix, if amorphous thermoplastic polymer is used, and above the melting temperature, if semi-crystalline thermoplastic polymer is used.

Heating during shear vacuum forming may be carried out, for example, by infrared lamps positioned below the flexible diaphragm and above the tool, or electrical heaters embedded in the tool, or liquid-filled heating pipes embedded in the tool.

Figure 11:
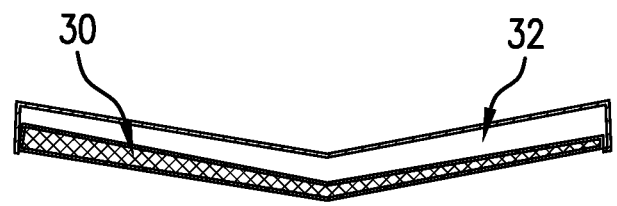
FIG. 11 shows a shaped preform conforming to the tool surface as result of the shear vacuum forming process.

Following consolidation under full vacuum and heating (either before or after full vacuum, the shaped preform is cooled. Vacuum pressure is preferably maintained until the binder or matrix material in the preform has cooled and solidified enough to maintain the preform's shape. After the shaped preform has cooled, vacuum pressure in the vacuum chamber is relieved by venting to atmosphere and the lid is lifted off. FIG. 11 shows the side view of the molding tool 32 with the shaped preform 30 thereon without the diaphragm 31.

If the shaped preform is composed of porous, liquid permeable fiber layers, then the shaped preform is separated from the tool, and subsequentluy infused with liquid resin in a resin infusion process such as vacuum-assisted RTM process. Subsequently, the resin-infused preform is cured to form a hardened composite structure.

If the shaped preform is composed of thermoset prepregs, it could be fully cured on the forming tool, or it could be transferred to a curing tool such as an oven. Optionally, the shaped preform is combined with additional shaped preforms to form a thicker preform prior to curing.

Figure 12:
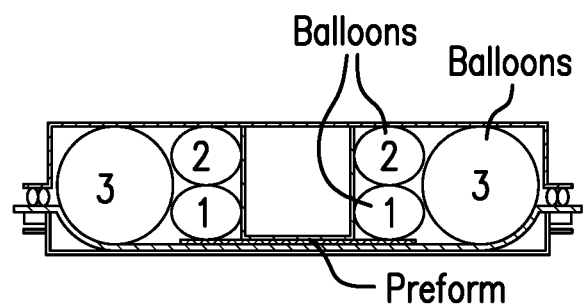
FIG. 12 shows an alternative embodiment for controlled shear vacuum forming using tubular balloons as restraints.

During the shear vacuum forming method disclosed herein, the number of balloons on each side of the tool may vary. For example, groups of three balloons (1, 2, 3) may be inserted into the spaces adjacent to the tool's sidewalls as shown in FIG. 12. The arrangement of FIG. 12 is substantially the same as that of FIG. 11 except for the number of balloons.

Figure 13:
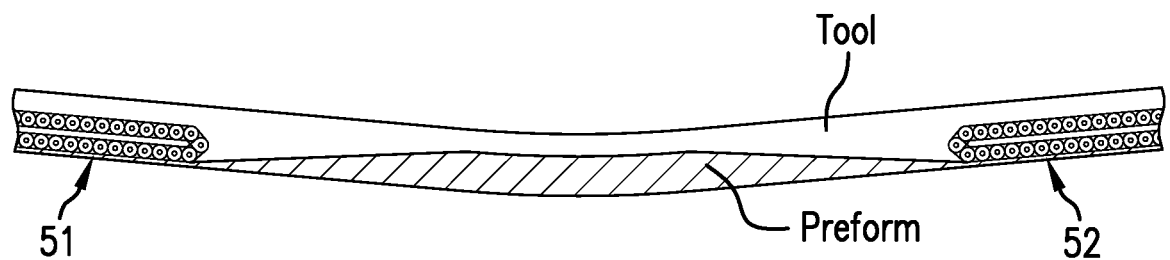
FIG. 13 shows an alternative embodiment for controlled shear vacuum forming using caterpillar tracks.

In place of tubular balloons as shown in FIGS. 6-12, caterpillar tracks may be used as the restraints during partial vacuuming. The caterpillar tracks that fold in on themselves would function similarly to the tubular balloons to prevent wrinkling. FIG. 13 is a side view illustrating how the caterpillar tracks 51, 52 can be used instead of the tubular balloons. The caterpillar tracks 51, 52 move away from the bent section of the tool during vacuum forming of the preform in the same manner as described for the tubular balloons. Each caterpillar track includes a chain of links interconnected by hinge elements. Affixed to each link, either mechanically or integral to the link, is a track shoe that is generally plate-shaped and is made of an elastic material such as rubber. The generally plate-shaped track shoes are connected to form an endless band. The track shoes have flat outer surfaces to spread the weight of the track while preventing damage to the diaphragms used during vacuum forming.

Preform Material

The fabric plies or the multiple fiber layers making up the preform material may include nonwoven mats, woven fabrics, knitted fabrics, and non-crimped fabrics. Such preform blank is porous and permeable to liquids. A "mat" is a nonwoven textile fabric made of randomly arranged fibers, such as chopped fiber filaments (to produce chopped strand mat) or swirled filaments (to produce continuous strand mat) with a binder applied to maintain its form. Suitable fabrics include those having directional or non-directional aligned fibers in the form of mesh, tows, tapes, scrim, braids, and the like.

For preform material composed of thermoset prepreg plies, each prepreg ply is composed of reinforcement fibers embedded in a thermoset resin matrix, which will harden upon curing. The thermoset resin matrix may contain one or more thermoset resins and a curing agent. Preferably, the thermoset resin matrix contains at least one epoxy resin, preferably, a blend of different epoxy resins, and at least one curing agent. The epoxy resin and curing agent, combined, constitute more than 50 wt. %, e.g., 60 wt %-100 wt. %, of the thermoset resin matrix.

Suitable epoxy resins include polyglycidyl derivatives of aromatic diamine, aromatic mono primary amines, aminophenols, polyhydric phenols, polyhydric alcohols, polycarboxylic acids. Examples of suitable epoxy resins include polyglycidyl ethers of the bisphenols such as bisphenol A, bisphenol F, bisphenol C, bisphenol S and bisphenol K; and polyglycidyl ethers of cresol and phenol based novolacs.

The curing agent is suitably selected from known curing agents, for example, aromatic or aliphatic amines, or guanidine derivatives.

As used in the present disclosure, the term "embedded" means fixed firmly and deeply in a surrounding mass, and the term "matrix" means a mass of material, e.g. polymer, in which something is enclosed or embedded.

For preform material composed of thermoplastic prepreg plies, each prepreg ply is composed of reinforcement fibers embedded in a thermoplastic polymer matrix. The thermoplastic polymer matrix includes one or more thermoplastic polymer(s), which may be amorphous or semi-crystalline. The thermoplastic polymer(s), in total, constitutes a majority component of the polymer matrix, i.e., more than 50 wt. %, for example, 80-100 wt. %, of the polymer matrix is composed of thermoplastic polymer(s). Suitable thermoplastic polymers include, but are not limited to: poly(aryl ether sulfone) (PAES), particularly, polyethersulphone (PES), polyetherethersulphone (PEES), poly(biphenyl ether sulfone) (PPSU); polyamide (PA); polyimide (PI); polyetherimide (PEI); poly(aryl ether ketone) (PAEK) polymers, such as polyetherketoneketone (PEKK), polyetheretherketone (PEEK), polyetherketoneketone (PEKK); polyphthalamide (PPA); thermoplastic polyurethane; poly (methyl methacrylate) (PMMA); polyphenylene sulfide (PPS); polyphenylene oxide (PPO); and copolymers thereof.

The reinforcement fibers in the fiber layers or prepregs may be organic or inorganic fibers, or mixtures thereof. Organic fibers are selected from tough or stiff polymers such as aramids (including Kevlar), high-modulus polyethylene (PE), polyester, poly-p-phenylene-benzobisoxazole (PBO), and hybrid combinations thereof. Inorganic fibers include fibers made of carbon (including graphite), glass (including E-glass or S-glass fibers), quartz, alumina, zirconia, silicon carbide, and other ceramics. For making high-strength composite structures, such as primary parts of an airplane, the reinforcement fibers preferably have a tensile strength of 3500 MPa (or ≥500 ksi) per ASTM D4018 test method.

An automated placement method such as Automated Tape Laying (ATL) or Automated Fiber Placement (AFP) may be used to build up, layer by layer, an intermediate preform blank of desired thickness. The ATL/AFP process involves automatically dispensing a plurality of narrow-width strips of fibrous material ("fiber tapes") or prepreg tapes, side by side, onto a tool surface to create a layer of large dimensions, referred to as a "ply". Additional plies are sequentially built onto the previously disposed ply to produce a layup with a desired thickness. The fiber tapes are porous and composed mostly of fibers while the prepreg tapes are not porous and are impregnated with a high amount of resin.

The fiber tapes or prepreg tapes for use in the automated placement method described above have a continuous length and a narrow width, for example, the width may be ⅛ in to 1.5 in (or 3.17 mm-38.1 mm), particularly, ¼ in to ½ in (or 6.35 mm –12.77 mm), which is typical for AFP. The fiber tapes may have a wider width, for example, 6 in to 12 in (or 152 mm-305 mm), which is typical for ATL.

Unlike conventional pre-impregnated tape (or prepreg tape), the fiber tape for forming the preform material is substantially resin-free except for a small amount of binder, which is sufficient to hold the fibers together. The total content of binder in the fiber tape may be about 15% or less by weight, for example, between 0.1 and 15% by weight, based on the total weight of the fiber tape. The fibers constitute the major component of the fiber tape, e.g. greater than 80% by weight based on the total weight of the fiber tape.

In one embodiment, the fiber tape is composed of a layer of unidirectional fibers laminated to a nonwoven veil at least on one side. "Unidirectional fibers" refers to fibers aligning parallel to each other in the same direction. The unidirectional fibers are high-strength reinforcement fibers such as carbon fibers, graphite fibers, glass fibers, ceramic fibers, and aramid fibers. The nonwoven veil may comprise thermoplastic fibers, carbon fibers, or a combination thereof. The fibers of the veil may be randomly arranged or randomly oriented, depending on the veil manufacturing process conditions. Alternatively, the nonwoven veil may be in the form of a thermoplastic grid or a porous, thermoplastic membrane with a controlled pattern of apertures. The openness of the nonwoven veil (whether in the form of random fibers, grid or porous membrane) is important to ease air removal and resin flow during the resin infusion process. When the thermoplastic veil is used, it also functions as a binder for holding the unidirectional fibers in place and will soften by heating during the automated placement method disclosed herein. In some embodiments, the areal weight of the nonwoven veil is 10 gsm or less, e.g., 1-10 gsm.

In one embodiment, the fiber tape is composed of a nonwoven carbon veil laminated to one side of a layer of unidirectional carbon fibers, and contains a binder composition in an amount sufficient for holding the veil and unidirectional fibers in place.

Binder

The binder for binding the loosely stacked fabric plies or the fiber layers in the preform blank may be in various forms, including powder, spray, liquid, paste, film, fibers, and non-woven veils. The binder material may be selected from thermoplastic polymers, thermoset resins, and combinations thereof. In certain embodiments, the binder may take the form of polymeric fibers formed from thermoplastic material or thermoset material, or a blend of thermoplastic and thermoset materials. In other embodiments, the binder is a mixture of thermoplastic fibers (i.e. fibers formed from thermoplastic material) and thermoset fibers (i.e. fibers formed from thermoset material). Such polymeric fibers may be incorporated into the preform blank as a non-woven veil composed of randomly-arranged polymeric fibers to be inserted between fibrous layers of the preform.

As an example, the binder material may be an epoxy resin in a powder form. As another example, the binder material may be a blend of one or more thermoplastic polymers and one or more thermoset resins in a powder form. As another example, the binder material is a non-woven veil composed of thermoplastic fibers.

If applied in spray form, the binder material may be suitably dissolved in a solvent such as dichloromethane. When solvent is used, subsequent removal of the solvent is required. In film form, a binder resin composition may be deposited (e.g. by casting) onto a release paper to form a film, which is then transferred to the fibrous layer of the preform. In powder form, the binder may be scattered onto the fibrous layer. When non-woven veil of polymeric fibers is used as binder material, each veil is inserted between adjacent fibrous layers during the laying up of the preform.

Preferably, the amount of binder in the preform is equal to or less than about 20% by weight based on the total weight of the preform, preferably, 0.5%-10% by weight, more preferably, 0.5%-6% by weight.

The binder in the preform is suitable for use with a wide variety of matrix resins to be injected into the preform by liquid resin infusion techniques, such as RTM. Moreover, the binder is selected to be chemically and physically compatible with the matrix resin to be injected into the preform.

When the dry preform is used in a resin injection process such as RTM, it is desirable that the binder does not form an impermeable film at the surface of the fibrous layers, which may prevent the matrix resin from satisfactorily penetrating through the thickness of the preform material during the resin injection cycle.

What is claimed is:

1. A shear vacuum forming method for producing a three-dimensional preform, said method comprising:
    (a) providing a molding tool having a length, a web surface with a convex bent section along the length, and two contiguous sidewalls extending from said web surface for forming flanges;
    (b) placing a preform material on a flexible diaphragm;
    (c) placing the molding tool over the preform material such that the web surface of the molding tool is in contact with a portion of the preform material;
    (d) placing at least two movable inner restraints next to each sidewall of the molding tool such that one end of each inner restraint is adjacent to the bent section of the web surface;
    (f) forming a vacuum sealed chamber defined by the flexible diaphragm and the molding tool, said vacuum sealed chamber enclosing the inner restraints and the preform material;
    (g) evacuating air from the vacuum sealed chamber until a partial vacuum is reached such that the flexible diaphragm is pulled toward the molding tool;
    (h) withdrawing each inner restraint along the sidewall of the molding tool in a direction away from the bent section during evacuation of the vacuumed sealed chamber such that there are at least two inner restraints moving in opposite direction along each sidewall of the molding tool, thereby allowing the preform material to come into contact with the sidewalls of the molding tool in a gradual manner; and
    (i) increasing vacuum pressure after the restraints have been withdrawn and the preform material has conformed to the molding tool, thereby forming a shaped preform, said vacuum pressure being sufficient to consolidate the shaped preform,
    wherein heating is applied to heat the preform material prior to evacuating air at (g) or after the shaped preform is formed at (i).

2. The method of claim 1, wherein the inner restraints are tubular balloons.

3. The method of claim 1, further comprising placing outer restraints adjacent to the inner restraints at (d) such that each outer restraint is adjacent to an inner restraint but is not in contact with the tool, and at (h) withdrawing the outer restraints in tandem with the inner restraints such that each outer restraint moves in the same direction as the adjacent inner restraint but only after said adjacent inner restraint started to move for an initial time period, and
    wherein the inner and outer restraints are in the form of tubular balloons.

4. The method of claim 1, wherein the inner restraints are caterpillar tracks, each caterpillar track comprising interconnected links and plate-shaped shoes forming an endless band.

5. The method according to claim 1, wherein the flexible diaphragm is made of an elastic material.

6. The method according to claim 1, wherein the preform material comprises inorganic or organic fibers.

7. The method according to claim 1, wherein the preform material comprises reinforcement fibers in the form of unidirectional fibers or woven fabric(s).

8. The method according to claim 1, wherein
    the preform material comprises an assembly of liquid-permeable fabric plies that have been treated with a binder, and
    heating of the preform material is carried out after the shaped preform is formed at (i) to soften the binder and to set the shape of the preform.

9. The method of claim 8, further comprising cooling the shaped preform after heating.

10. The method according to claim 1, wherein
the preform material comprises a layup of a plurality of prepreg plies in a stacking arrangement, each prepreg ply comprising reinforcement fibers embedded in a thermoset resin matrix or a thermoplastic matrix.

11. The method of claim 10, wherein each prepreg ply comprises reinforcement fibers embedded in a curable thermoset resin matrix, said matrix comprising one or more epoxy resins and a curing agent, and
heating of the preform material is carried out prior to evacuating air at (g) at a temperature below the curing temperature of the thermoset resin matrix.

12. The method of claim 11, further comprising cooling the shaped preform after step (i).

13. The method of claim 10, wherein
each prepreg ply comprises reinforcement fibers embedded in a thermoplastic polymer matrix, and
heating of the preform material is carried out after the shaped preform is formed at (i) to soften the thermoplastic polymer matrix and to set the shape of the preform.

14. The method according to claim 13, further comprising cooling the shaped preform after heating.

15. The method according to claim 1, wherein
the preform material comprises two or more liquid-permeable fiber layers in a stacking arrangement,
each fiber layer is formed by depositing a plurality of elongated or continuous tapes of fibrous material side-by-side in an automated placement process,
each elongated or continuous tape of fibrous material comprises a nonwoven veil laminated to at least one side of a layer of unidirectional fibers and a binder in an amount sufficient for holding the nonwoven veil and the unidirectional fibers together.

16. The method according to claim 15, wherein the nonwoven veil of each elongated or continuous tape of fibrous material comprises randomly arranged carbon fibers or thermoplastic fibers.

17. The method of claim 3, wherein each tubular balloon is configured so that it has an outer surface that can be folded into the center of the balloon.

18. The method of claim 5, wherein the flexible diaphragm is made of rubber, silicone, or nylon.

19. The method of claim 6, wherein the preform material comprises fibers selected from carbon fibers, glass fibers, and polymeric fibers.

20. The method of claim 15, wherein the amount of binder in each elongated or continuous tape of fibrous material is no more than 15% by weight based on the total weight of the tape.

* * * * *